(12) United States Patent
Green et al.

(10) Patent No.: US 7,687,451 B2
(45) Date of Patent: Mar. 30, 2010

(54) AQUEOUS POLYMER FORMULATIONS

(75) Inventors: Michael Green, Huddersfield (GB); David Normington, Leeds (GB); Keith Graham, Huddersfield (GB); Gerhard Merkle, Freiburg (DE); Emmanuel Martin, Folgensbourg (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 12/287,307

(22) Filed: Oct. 8, 2008

(65) Prior Publication Data

US 2009/0062174 A1 Mar. 5, 2009

Related U.S. Application Data

(62) Division of application No. 10/516,925, filed as application No. PCT/EP03/05563 on May 27, 2003, now Pat. No. 7,452,854.

(30) Foreign Application Priority Data

Jun. 4, 2002 (EP) .................. 02405448
Oct. 21, 2002 (EP) .................. 02405895

(51) Int. Cl.
*C11D 3/37* (2006.01)
(52) U.S. Cl. .................... 510/475
(58) Field of Classification Search ........... 510/475
See application file for complete search history.

(56) References Cited

U.S. PATENT DOCUMENTS

| 4,806,345 | A | 2/1989 | Bhattacharyya | 424/70 |
| 5,114,600 | A | 5/1992 | Biggin et al. | 252/86 |
| 5,146,000 | A | 9/1992 | Ozbalik | 568/26 |
| 5,180,473 | A | 1/1993 | Akune et al. | 162/168.2 |
| 5,340,865 | A | 8/1994 | Neff et al. | 524/317 |
| 6,326,430 | B1 | 12/2001 | Berte' | 524/555 |
| 2005/0009728 | A1 | 1/2005 | Smith et al. | 510/515 |

FOREIGN PATENT DOCUMENTS

| DE | 43 13 085 | 10/1994 |
| EP | 0374458 | 6/1990 |
| EP | 0 799 887 | 6/2003 |
| FR | 2589145 | 4/1987 |
| FR | 2812295 | 2/2002 |
| JP | 09003793 | 1/1997 |
| WO | 90/12862 | 11/1990 |
| WO | 02/057400 | 7/2002 |
| WO | WO 02/057322 A1 * | 7/2002 |

OTHER PUBLICATIONS

English Language Translation of DE 43 13 085 from the U.S. PTO Feb. 2006.
Research Disclosure (Jan. 2000), vol. 129, No. 116, p. 136.
Patent Abstracts of Japan Publication No. 09003793 (1997).

* cited by examiner

*Primary Examiner*—John R Hardee
(74) *Attorney, Agent, or Firm*—Joseph C. Suhadolnik

(57) ABSTRACT

This invention relates to thickened aqueous formulations containing cross-linked cationic polymers, novel homo- and copolymers, their production and their use as thickeners for household formulations.

15 Claims, No Drawings

AQUEOUS POLYMER FORMULATIONS

This is a divisional of U.S. application Ser. No. 10/516,925, which is a 371 of PCT/EP 03/05563 filed May 27, 2003, now U.S. Pat. No. 7,452,854, the disclosures of which are hereby incorporated by reference.

This invention relates to thickened aqueous formulations, novel homo- and copolymers, their production and their use as thickeners for household formulations.

It is standard practice to include viscosifying polymers in aqueous household formulation in order to achieve optimum rheology characteristics. Various polymer types have been proposed for the purpose of increasing the viscosity of household formulations.

EP-A-422179 is concerned with aqueous fabric conditioner solutions containing a cationic polymer containing between 5-45 ppm cross-linking agent and wherein the amount of cross-linking agent is within 33% of the amount that causes the solution to exhibit peak viscosity. The polymer is said to be in the form of particles, which have a size that does not exceed 10 microns.

U.S. Pat. No. 6,020,304 describes fabric softening compositions containing an associative polymer containing associative polymer containing 5 to 45 ppm cross-linking agent and also containing a chelating agent.

EP-A-458599 refers to fabric treatment compositions consisting of an aqueous base, fabric softening materials and a deflocculating polymer.

WO-A-99/06455 describes thickening agents for acidic compositions, which include cationic homopolymers with 50 to 600 ppm cross-linking agents. The preferred range of cross-linking agent is between 60 and 250 ppm.

Although the polymers used in the fabric and household formulations described in the prior art do achieve viscosification of the composition, there is still a need to provide further improvement in rheology profile. This is particularly important where the household composition is expected to perform under a number of different conditions and environments.

According to the present invention an aqueous formulation comprising a cationic polymer formed from
  a) a water soluble ethylenically unsaturated monomer or blend of monomers comprising at least one cationic monomer
  b) at least one cross-linking agent in an amount of more than 50 ppm by the weight of component a)
  c) and at least one chain transfer agent.

Preferably the cationic polymer is added to the formulation while in the form of particles, which have a volume average size of below 10 microns.

Preferably, the component a) comprises 30 to 100% by weight (wt-%), based on the total weight of component a), of at least one cationic monomer and 0-80 wt-% of at least one monomer, which is non-ionic or anionic.

More preferably, the component a) comprises 50 to 100 wt-%, based on the total weight of component a), of at least one cationic monomer and 0-50 wt-% of at least one monomer, which is non-ionic or anionic.

Preferred cationic monomers are compounds according to formula (I)

$$R_1-\underset{H}{C}=\underset{R_2}{C}-\overset{O}{\underset{\|}{C}}-X-R_3-\underset{R_6}{\overset{R_4}{\underset{|}{N^+}}}-R_5 \quad Y^-\quad (I)$$

wherein
  $R_1$ is hydrogen or methyl,
  $R_2$ is hydrogen or $C_1$-$C_4$alkyl,
  $R_3$ is $C_1$-$C_4$alkylene,
  $R_4$, $R_5$ and $R_6$ are independently from each other hydrogen or $C_1$-$C_4$alkyl,
  X is —O— or —NH— and
  Y is Cl; Br; I; hydrogensulphate or methosulfate.
  The alkyl groups may be linear or branched.
  Preferred non-ionic monomers are N-vinyl pyrrolidone or compounds of formula (II)

$$R_7-\underset{H}{C}=\underset{R_8}{C}-\overset{O}{\underset{\|}{C}}-N\underset{R_{10}}{\overset{R_9}{\diagup}} \quad (II)$$

wherein
  $R_7$ signifies hydrogen or methyl,
  $R_8$ signifies hydrogen or $C_1$-$C_4$alkyl, and
  $R_9$ and $R_{10}$ signify independently from each other hydrogen or $C_1$-$C_4$alkyl.

Preferably, the cross-linking agent b) contains at least two ethylenically unsaturated moieties. Suitable preferred cross-linking agents are divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers, such as polyallylsaccharose and pentaerythritol triallylether.

More preferred cross-linking agents are tetra allyl ammonium chloride; allyl-acrylamides and allyl-methacrylamides; bisacrylamidoacetic acid and N,N'-methylene-bisacrylamide.

The most preferred cross-linking agents are tetra allyl ammonium chloride and N,N'-methylene-bisacrylamide.

It is also suitable to use mixtures of cross-linking agents.

In a preferred embodiment of the present invention at least one cross-linking agent b) is included in the range of 50-1200 ppm (based on the component a), more preferred in the range of 500-1000 ppm (based on the component a), most preferred in the range of 700-900 ppm (based on the component a).

Preferably, the chain transfer agent c) is selected from mercaptanes, malic acid, lactic acid, formic acid, isopropanol and hypophosphites.

In a preferred embodiment of the invention the chain transfer agent c) is present in a range of from 10 to 50000 ppm (based on the component a), more preferably in a range of 100-10000 ppm (based on the component a).

In a preferred embodiment of the present invention the aqueous formulation comprises 0.005 to 15 wt-% of the cationic polymer, more preferably 0.01 to 10 wt-%, most preferably 0.01 to 5 wt-%. The weight percentages relate to the total amount of the aqueous formulation.

A preferred formulation contains 0.01-5 wt-%, based on the total amount of the aqueous formulation, more preferred 0.01 to 10 wt-%, most preferred 0.01 to 5 wt-% of a cationic polymer and wherein the cationic polymer is formed from at least one compound of formula (Ia)

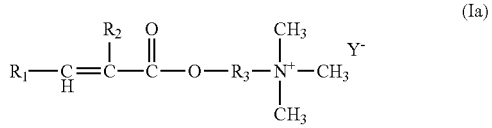

wherein
$R_1$ is hydrogen or methyl,
$R_2$ is hydrogen or methyl,
$R_3$ is $C_1$-$C_2$alkylene and
Y is Cl; Br or I, and
a) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 50-1200 ppm (based on the component a), more preferred in an amount of 500-1000 ppm (based on the component a), most preferred in an amount of 700-900 ppm (based on the component a), and
b) at least one chain transfer agent selected from mercaptanes; malic acid; lactic acid; formic acid; isopropanol and hypophosphites in an amount of 1000-9000 ppm (based on the component a), preferably an amount of 2000-5000 ppm (based on the component a).

The aqueous formulations are. useful as household formulations. Household compositions can be any common known formulations, such as general-purpose cleaners for cleaning hard surfaces, acid household cleaners (bath), WC cleaners or laundry care products like fabric rinse formulation or fabric softener.

Household cleaning agents are aqueous or alcoholic (for example ethanol or isopropyl alcohol) solutions of one or more of the following components:
anionic, nonionic, amphoteric and/or cationic surfactants;
soaps, prepared by saponification of animal and vegetable greases, like coconut and tallow grease;
organic acids, like hydrochloric acid, phosphoric acid, or sulfuric acid;
for basic products inorganic (NaOH or KOH) or organic bases like triethanolamine;
abrasives for improved cleaning of surfaces, such as silicas, seed kernel or polyethylene;
waxes and/or silicones for maintenance and protection of surfaces;
polyphosphates;
substances, which eliminate hypochlorite or halogens;
peroxides comprising bleaching activators like TAED, for example sodium perborate, $H_2O_2$ or hypochlorite;
enzymes;
in washing detergents discoloration inhibitors, soil-release compounds, grey scale inhibitors, foam inhibitors, fluorescent whitening agents;
cleaning agents based on wax may comprise solvents selected from benzine, turpentine and/or paraffines and emulsifiers based on wax;
filling agents like silicates, polyphosphates, such sodium or potassium tripolyphosphate, Zeolithes for powdery cleaning agents;
pigments, lakes or soluble dyes;
perfumes; and
light stabilizers, antioxidants, antimicrobials and chelating agents.

Fabric Softener

Fabric softeners, especially hydrocarbon fabric softeners, suitable for use herein are selected from the following classes of compounds:

(i) Cationic quaternary ammonium salts. The counter ion of such cationic quaternary ammonium salts may be a halide, such as chloride or bromide, methyl sulphate, or other ions well known in the literature. Preferably the counter ion is methyl sulfate or any alkyl sulfate or any halide, methyl sulfate being most preferred for the dryer-added articles of the invention.

Examples of cationic quaternary ammonium salts include but are not limited to:

(1) Acyclic quaternary ammonium salts having at least two $C_8$ to $C_{30}$, preferably $C_{12}$ to $C_{22}$ alkyl or alkenyl chains, such as: ditallowedimethyl ammonium methylsulfate, di(hydrogenated tallow)dimethyl ammonium methylsulfate, di(hydrogenated tallow)dimethyl ammonium methylchloride, distearyldimethyl ammonium methyl-sulfate, dicocodimethyl ammonium methylsulfate and the like. It is especially preferred if the fabric softening compound is a water insoluble quaternary ammonium material which comprises a compound having two $C_{12}$ to $C_{18}$ alkyl or alkenyl groups connected to the molecule via at least one ester link. It is more preferred if the quaternary ammonium material has two ester links present. An especially preferred ester-linked quaternary ammonium material for use in the invention can be represented by the formula:

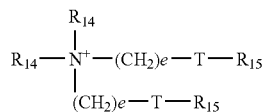

wherein each $R_{14}$ group is independently selected from $C_1$ to $C_4$ alkyl, hydroxyalkyl or $C_2$ to $C_4$ alkenyl groups; T is either —O—C(O)— or —C(O)—O—, and wherein each $R_{15}$ group is independently selected from $C_8$ to $C_{28}$ alkyl or alkenyl groups; and e is an integer from 0 to 5.

A second preferred type of quaternary ammonium material can be represented by the formula:

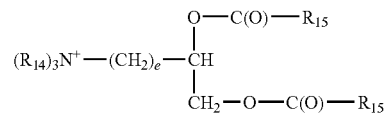

wherein $R_{14}$, $R_{15}$ and e are as defined above.

(2) Cyclic quaternary ammonium salts of the imidazolinium type such as di(hydrogenated tallow)dimethyl imidazolinium methylsulfate, 1-ethylene-bis(2-tallow-1-methyl) imidazolinium methylsulfate and the like;

(3) Diamido quaternary ammonium salts such as: methyl-bis(hydrogenated tallow amidoethyl)-2-hydroxethyl ammonium methyl sulfate, methyl bi(tallowamidoethyl)-2-hydroxypropyl ammonium methylsulfate and the like;

(4) Biodegradable quaternary ammonium salts such as N,N-di(tallowoyl-oxy-ethyl)-N,N-dimethyl ammonium methyl sulfate and N,N-di(tallowoyl-oxy-propyl)-N,N-dimethyl ammonium methyl sulfate. Biodegradable quaternary ammonium salts are described, for example, in U.S. Pat. Nos. 4,137,180, 4,767,547 and 4,789,491 incorporated by reference herein.

Preferred biodegradable quaternary ammonium salts include the biodegradable cationic diester compounds as described in U.S. Pat. No. 4,137,180, herein incorporated by reference.

(ii) Tertiary fatty amines having at least one and preferably two $C_8$ to $C_{30}$, preferably $C_{12}$ to $C_{22}$ alkyl chains. Examples include hardened tallow-di-methylamine and cyclic amines such as 1-(hydrogenated tallow)amidoethyl-2-(hydrogenated tallow) imidazoline. Cyclic amines, which may be employed for the compositions herein, are described in U.S. Pat. No. 4,806,255 incorporated by reference herein.

(iii) Carboxylic acids having 8 to 30 carbons atoms and one carboxylic group per molecule. The alkyl portion has 8 to 30, preferably 12 to 22 carbon atoms. The alkyl portion may be linear or branched, saturated or unsaturated, with linear saturated alkyl preferred. Stearic acid is a preferred fatty acid for use in the composition herein. Examples of these carboxylic acids are commercial grades of stearic acid and palmitic acid, and mixtures thereof, which may contain small amounts of other acids.

(iv) Esters of polyhydric alcohols such as sorbitan esters or glycerol stearate. Sorbitan esters are the condensation products of sorbitol or iso-sorbitol with fatty acids such as stearic acid. Preferred sorbitan esters are monoalkyl. A common example of sorbitan ester is SPAN® 60 (ICI) which is a mixture of sorbitan and isosorbide stearates.

(v) Fatty alcohols, ethoxylated fatty alcohols, alkyphenols, ethoxylated alkyphenols, ethoxylated fatty amines, ethoxylated monoglycerides and ethoxylated diglycerides.

(vi) Mineral oils, and polyols such as polyethylene glycol.

These softeners are more definitively described in U.S. Pat. No. 4,134,838 the disclosure of which is incorporated by reference herein. Preferred fabric softeners for use herein are acyclic quaternary ammonium salts. Mixtures of the above mentioned fabric softeners may also be used.

The fabric softening composition employed in the present invention preferably contains about 0.1 to about 95 wt-%, based on the total weight of the fabric softening composition, of the fabric softening component. Preferred is an amount of 0.5 to 50 wt-%, especially an amount of 2 to 50 wt-% and most preferably an amount of 2 to 30 wt-%.

The amount of the cationic polymer in the fabric softening composition is preferably 0.005 to 15 wt-%, based on the total weight of the fabric softening composition. Preferred is an amount of 0.01 to 10 wt-%, especially an amount of 0.05 to 5 wt-% and most preferably an amount of 0.1 to 5 wt-%.

The fabric softening composition may also comprise additives which are customary for standard commercial fabric softening compositions, for example alcohols, such as ethanol, n-propanol, i-propanol, polyhydric alcohols, for example glycerol and propylene glycol; amphoteric and nonionic surfactants, for example carboxyl derivatives of imidazole, oxyethylated fatty alcohols, hydrogenated and ethoxylated castor oil, alkyl polyglycosides, for example decyl polyglucose and dodecylpolyglucose, fatty alcohols, fatty acid esters, fatty acids, ethoxylated fatty acid glycerides or fatty acid partial glycerides; also inorganic or organic salts, for example water-soluble potassium, sodium or magnesium salts, non-aqueous solvents, pH buffers, perfumes, dyes, hydrotropic agents, antifoams, anti redeposition agents, enzymes, optical brighteners, antishrink agents, stain removers, germicides, fungicides, dye fixing agents or dye transfer inhibitors (as described in WO-A-02/02865), antioxidants, corrosion inhibitors, wrinkle recovery or wet soiling reduction agent, such as polyorganosiloxanes. The latter two additives are described in WO-A-01/25385.

Such additives are preferably used in an amount of 0 to 30 wt-%, based on the total weight of the fabric softening composition. Preferred is an amount of 0 to 20 wt-%, especially an amount of 0 to 10 wt-% and most preferably an amount of 0 to 5% wt-%.

The fabric softener compositions are preferably in liquid aqueous form. The fabric softener compositions preferably contain a water content of 25 to 90 wt-%, based on the total weight of the composition. More preferably the water content is 50 to 90 wt-%, especially 60 to 90 wt-%.

The fabric softener compositions preferably have a pH value from 2.0 to 9.0, especially 2.0 to 5.0.

The fabric softener compositions can, for example, be prepared as follows:

Firstly, an aqueous formulation of the cationic polymer is prepared as described above. The fabric softener composition according to the invention is usually, but not exclusively, prepared by firstly stirring the active substance, i.e. the hydrocarbon based fabric softening component, in the molten state into water, then, where required, adding further desired additives and, finally, adding the formulation of the cationic polymer. The fabric softener composition can, for example, also be prepared by mixing a preformulated fabric softener with the cationic polymer.

These fabric softener compositions are traditionally prepared as dispersions containing for example up to 30 wt-% of active material in water. They usually have a turbid appearance. However, alternative formulations usually containing actives at levels of 5 to 40 wt-% along with solvents can be prepared as microemulsions, which have a clear appearance (as to the solvents and the formulations see for example U.S. Pat. No. 5,543,067 and WO-A-98/17757).

A highly preferred fabric softener composition according to the present invention is in liquid form and comprises:

A) 0.5 to 50 wt-%, based on the total weight of the composition, of the fabric softener;

B) 0.005 to 15 wt-%, based on the total weight of the composition, of the cationic polymer;

C) 0 to 20 wt-%, based on the total weight of the composition, of customary additives; and D) water to 100%.

The fabric softener compositions may also comprise a perfume as a customary additive. Perfume is preferably used in an amount of 0 to 5 wt-%, based on the total weight of the composition. Preferred is an amount of 0 to 3 wt-%, especially an amount of 0 to 2 wt-%, based on the total amount of the composition.

The term "perfume" or "fragrance" as used herein refers to odoriferous materials which are able to provide a pleasing fragrance to fabrics, and encompasses conventional materials commonly used in detergent compositions to counteract a malodor in such compositions and/or provide a pleasing fragrance thereto. The perfumes are preferably in the liquid state at ambient temperature, although solid perfumes are also useful. Included among the perfumes contemplated for use herein are materials such as aldehydes, ketones, esters and the like which are conventionally employed to impart a pleasing fragrance to liquid and granular deterent compositions. Naturally ocurring plant and animal oils are also commonly used as components of perfumes. Accordingly, the perfumes useful for the present invention may have relatively simple compositions or may comprise complex mixtures of natural and synthetic chemical components, all of which are intended to provide a pleasant odor or fragrance when applied to fabrics. The perfumes used in detergent compositions are generally selected to meet normal requirements of odor, stability, price and commercial availability. The term "fragrance" is often used herein to signify a perfume itself, rather than the aroma imparted by such perfume.

A further important embodiment of the present invention is a fabric softener composition according to the present invention is in liquid form and comprises:
A) 0.5 to 50 wt-%, based on the total weight of the composition, of the fabric softener;
B) 0.005 to 15 wt-%, based on the total weight of the composition, of the cationic polymer;
C) 0 to 20 wt-%, based on the total weight of the composition, of customary additives; and
D) 0 to 5 wt-%, based in the total weight of the composition, of a perfume
E) water to 100%.

As a further customary additive, the fabric softener compositions may also comprise at least one component capable of sequestering properties, that is a component which acts to sequester (chelate) metal ions. Such compound may be selected from the group consisting of a chelating component, a polycarboxylic building component and mixtures thereof.

Chelating components are present at a level of up to 0.5 wt-%, more preferably from 0.005 to 0.25 wt-%, most preferably from 0.01 to 0.1 wt-%, based on the total weight of the composition.

Suitable chelating components for use in the present invention are selected from the group consisting of amino carboxylic acid, organo aminophosphonic acid compounds, and mixture thereof.

Chelating components, which are acidic in nature, having for example phosphonic acid or carboxylic acid functionalities, may be present either in their acid form or as a complex/salt with a suitable counter cation such as an alkali or alkaline metal ion, ammonium, or substituted ammonium ion, or any mixtures thereof. Preferably any salts/complexes are water soluble. The molar ratio of said counter cation to the chelating component is preferably at least 1:1.

Suitable chelating components for use herein include the amino carboxylic acids such as ethylenediamine-N,N'-disuccinic acid (EDDS), ethylenediamine tetraacetic acid (EDTA), N-hydroxyethylenediamine triacetic acid, nitrilotriacetic acid (NTA), ethylene diamine tetrapropionic acid, ethylenediamine-N,N'-diglutamic acid, 2-hydroxypropylenediamine-N,N'-disuccinic acid, triethylenetetraamine hexacetic acid, diethylenetriamine pentaacetic acid (DETPA), trans 1,2 diaminocyclohexane-N,N,N',N'-tetraacetic acid or ethanoldiglycine.

Other suitable chelating components for use herein include the organo aminophosphonic acids such as ethylenediamine tetrakis(methylenephosphonic acid), diethylene triamine-N,N,N',N'',N''-pentakis (methylene phosphonic acid) (DETMP), 1-hydroxyethane 1,1-diphosphonic acid (HEDP) or hydroxyethane dimethylenephosphonic acid.

Mixture of any of the herein before described chelating components can also be used.

Especially preferred is ethylenediamine-N,N'-disuccinic acid (EDDS), most preferably present in the form of its S,S isomer, which is preferred for its biodegradability profile.

Polycarboxylic building components are present at a level of up to 0.045 wt-% (450 ppm), preferably at a level of from 0.045 to 0.5 wt-%, more preferably from 0.09 to 0.25 wt-%, most preferably from 0.1 to 0.2 wt-% by weight, based on the total weight of the composition.

Suitable polycarboxylic building components for use herein can be monomeric or oligomeric in type although monomeric polycarboxylates are generally preferred for reasons of cost and performance.

Polycarboxylic acids containing two carboxy groups include succinic acid, malonic acid, (ethylenedioxy) diacetic acid, maleic acid, diglycolic acid, tartaric acid, tartronic acid and fumaric acid, as well as the ether carboxylic acid and the sulfinyl carboxylic acids. Polycarboxylic acids containing three carboxy groups include, in particular, citric acid, aconitric and citraconic as well as succinic derivatives such as the carboxymethyloxysuccinic described in British Patent No. 1,379,241, lactoxysuccinic described in British Patent No. 1,389,732, and aminosuccinic described in Netherlands Application NL 7205873, and the oxypolycarboxylic materials such as 2-oxa-1,1,3-propane tricarboxylic described in British Patent No. 1,387,447.

Polycarboxylic containing four carboxy groups include oxydisuccinic disclosed in British Patent No. 1,261,829,1,1,2,2-ethane tetracarboxylic, 1,1,3,3-propane tetracarboxylic and 1,1,2,3-propane tetracarboxylic. Polycarboxylic containing sulfo substituents include the sulfosuccinate derivatives disclosed in British Patent Nos. 1,398,421 and 1,398,422 and in U.S. Pat. No. 3,936,448, and the sulfonated pyrolysed citric described in British Patent No. 1,439,000.

Alicyclic and heterocyclic polycarboxylic include cyclopentane-cis,cis,cis-tetracarboxylic, cyclopentadienide pentacarboxylic, 2,3,4,5-tetrahydrofuran-cis, cis, cis-tetracarboxylic, 2,5-tetrahydrofuran-cis-dicarboxylic, 2,2,5,5-tetrahydrofuran-tetracarboxylic, 1,2,3,4,5,6-hexanehexacarboxylic and carboxymethyl derivatives of polyhydric alcohols such as sorbitol, mannitol and xylitol. Aromatic polycarboxylic include mellitic acid, pyromellitic acid and the phthalic acid derivatives disclosed in British Patent No. 1,425,343. Although suitable for use, citric acid is less preferred for the purpose of the invention.

Of the above, the preferred polycarboxylic are carboxylic containing up to three carboxy groups per molecule, more particularly maleic acid.

A further important embodiment of the present invention is a fabric softener composition according to the present invention is in liquid form and comprises:
A) 0.5 to 50 wt-%, based on the total weight of the composition, of the fabric softener;
B) 0.005 to 15 wt-%, based on the total weight of the composition, of the cationic polymer;
C) 0 to 20 wt-%, based on the total weight of the composition, of customary additives;
D) 0 to 5 wt-%, based in the total weight of the composition, of a perfume;
E) 0 to 0.5 wt-%, based in the total weight of the composition, a component capable of sequestering metal ions and selected from the group consisting of:
  i) chelating components selected from the group consisting of amino carboxylic acid, organo aminophosphonic acid components, and mixtures thereof,
  ii) polycarboxylic building components, other than those defined under i) as chelating components, comprising at least two carboxylic radicals separated from each other by not more than two carbon atoms, and,
  iii) mixtures thereof; and
F) water to 100%.

The fabric softener compositions can also be used in the form of tumble dryer sheet composition. In tumble dryer applications the compositions are usually incorporated into impregnates on non-woven sheets.

Hard Surface Cleaner

The actual active ingredient and the actual minimum effective amount will be determined by the actual product/application in which the thickened composition is to be used.

A preferred hard surface cleaning composition comprises:
(i) 0.005-15 wt-%, based on the total weight of the composition, the cationic polymer;
(ii) 1-80 wt-%, based on the total weight of the composition, of at least one detergent and or at least one soap and/or at least one salt of a saturated $C_8$-$C_{22}$ fatty acid and/or at least one unsaturated $C_8$-$C_{22}$ fatty acid;
(iii) 0-50 wt-%, based on the total weight of the composition, of at least one alcohol;
(iv) 0-50 wt-%, based on the total weight of the composition, of typical ingredients for cleaning composition; I
(v) 0-50 wt-%, based on the total weight of the composition, of at least one acid; and
(vi) tap water or deionised water ad 100 wt-%.

As component (ii), anionic, nonionic, or zwitterionic and amphoteric synthetic detergents are suitable.

Suitable anionic detergents are sulfates, for example fatty alcohol sulfates, the alkyl chain of which has from 8 to 18 carbon atoms, for example sulfated lauryl alcohol;

fatty alcohol ether sulfates, for example the acid esters or salts thereof of a polyaddition product of from 2 to 30 mol of ethylene oxide and 1 mol of a $C_8$-$C_{22}$ fatty alcohol;

the alkali metal, ammonium or amine salts, referred to as soaps, of $C_8$-$C_{20}$ fatty acids, for example coconut fatty acid;

alkylamide sulfates;

alkylamine sulfates, for example monoethanolamine lauryl sulfate;

alkylamide ether sulfates;

alkylaryl polyether sulfates;

monoglyceride sulfates;

alkanesulfonates, the alkyl chain of which contains from 8 to 20 carbon atoms, for example dodecyl sulfonate;

alkylamide sulfonates;

alkylaryl sulfonates;

α-olefin sulfonates;

sulfosuccinic acid derivatives, for example alkyl sulfosuccinates, alkyl ether sulfosuccinates or alkylsulfosuccinamide derivatives;

N-[alkylamidoalkyl]amino acids of formula

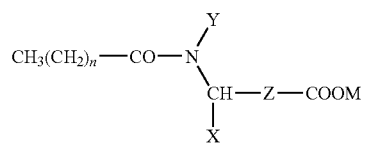

wherein
X is hydrogen; $C_1$-$C_4$alkyl or —COOM,
Y is hydrogen or $C_1$-$C_4$alkyl,
Z is

$m_1$ is from 1 to 5,
n is an integer from 6 to 18 and
M is an alkali metal cation or amine cation, alkyl and alkylaryl ether carboxylates of formula $CH_3$—X—Y-A wherein
X is a radical of formula —$(CH_2)_{5-19}$—O—,

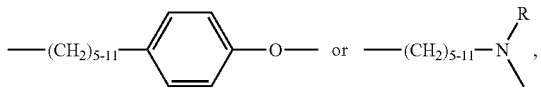

R is hydrogen or $C_1$-$C_4$alkyl,
Y is —$(CHCHO)_{1-50}$—,
A is $(CH_2)_{m2-1}$—COOM or
$m_2$ is from 1 to 6 and
M is an alkali metal cation or amine cation.

Also used as anionic surfactants are fatty acid methyl taurides, alkyl isothionates, fatty acid polypeptide condensation products and fatty alcohol phosphoric acid esters. The alkyl radicals occurring in those compounds preferably have from 8 to 24 carbon atoms.

The anionic surfactants are generally in the form of their water-soluble salts, such as the alkali metal, ammonium or amine salts. Examples of such salts include lithium, sodium, potassium, ammonium, triethylamine, ethanolamine, diethanolamine and triethanolamine salts. The sodium, potassium or ammonium ($NR_1R_2R_3$) salts, especially, are used, with $R_1$, $R_2$ and $R_3$ each independently of the others being hydrogen, $C_1$-$C_4$alkyl or $C_1$-$C_4$hydroxyalkyl.

Especially preferred anionic surfactants in the composition according to the invention are monoethanolamine lauryl sulfate or the alkali metal salts of fatty alcohol sulfates, especially sodium lauryl sulfate and the reaction product of from 2 to 4 mol of ethylene oxide and sodium lauryl ether sulfate.

Suitable zwitterionic and amphoteric surfactants include $C_8$-$C_{18}$betaines, $C_8$-$C_{18}$sulfobetaines, $C_8$-$C_{24}$alkylamido-$C_1$-$C_4$alkylenebetaines, imidazoline carboxylates, alkylamphocarboxy-carboxylic acids, alkylamphocarboxylic acids (e.g. lauroamphoglycinate) and N-alkyl-β-aminopropionates or -iminodipropionates, with preference being given to $C_{10}$-$C_{20}$alkylamido-$C_1$-$C_4$alkylenebetaines and especially to coconut fatty acid amide propylbetaine.

Nonionic surfactants that may be mentioned include, for example, derivatives of the adducts of propylene oxide/ethylene oxide having a molecular weight of from 1000 to 15 000, fatty alcohol ethoxylates (1-50 EO), alkylphenol polyglycol ethers (1-50 EO), polyglucosides, ethoxylated hydrocarbons, fatty acid glycol partial esters, for example diethylene glycol monostearate, fatty acid alkanolamides and dialkanolamides, fatty acid alkanolamide ethoxylates and fatty amine oxides.

As component (ii) there may also be used the salts of saturated and unsaturated $C_8$-$C_{22}$ fatty acids either alone or in the form of a mixture with one another or in the form of a mixture with other detergents mentioned as component (ii). Examples of such fatty acids include, for example, capric, lauric, myristic, palmitic, stearic, arachidic, behenic, caproleic, dodecenoic, tetradecenoic, octadecenoic, oleic, eicosenoic and erucic acid, and the commercial mixtures of such acids, such as, for example, coconut fatty acid. Such acids are present in the form of salts, there coming into consideration as cations alkali metal cations, such as sodium and potassium cations, metal atoms, such as zinc and aluminium atoms, and nitrogen-containing organic compounds of sufficient alkalinity, such as amines and ethoxylated amines. Such salts may also be prepared in situ.

As component (iii) there come into consideration as dihydric alcohols especially those compounds having from 2 to 6 carbon atoms in the alkylene moiety, such as ethylene glycol, 1,2- or 1,3-propanediol, 1,3-, 1,4- or 2,3-butanediol, 1,5-pentanediol and 1,6-hexanediol.

Preference is given to 1,2-propanediol (propylene glycol).

Preferred monohydric alcohols are ethanol, n-propanol and isopropanol and mixtures of those alcohols.

Thickened aqueous compositions according to the invention also include those compositions, which comprise a second surfactant in minimum cleansing amounts. Such thickened compositions include, for example, liquid hand dishwashing detergents. Exemplary second surfactants, which may be used in the thickened aqueous compositions, include, without limitation, sodium lauryl sulfate, (di)alkylsulfosuccinates, alkyl sulfonates, alkyl phosphates, alkyl ethoxylates, and alkylaryl ethoxylates. It should be noted that the second surfactant is in addition to the first surfactant. It is preferred that the second surfactant be selected from the group consisting of anionic and nonionic surfactants, and thus may be different than the first surfactant used to prepare the formulation.

As component (iv) the thickened aqueous compositions may further comprise conventional ingredients known to be used therein. Such ingredients may be perfumes, colorants, bactericide, dyes, chelants, pigments, solvents, corrosion inhibitors and the like.

Exemplary acids used as component (v) of the present invention include, without limitation, citric, sulfuric, hydrochloric, phosphoric, acetic, hydroxyacetic, and sulfamic acids.

A further embodiment of the present invention is a cleaning composition such as a toilet bowl cleaner, a hard surface cleaner or a liquid hand dishwashing detergent, wherein the active ingredient is selected from the group consisting of an acid and a surfactant, present at a minimum amount effective to achieve minimum cleansing performance. By minimum cleansing performance, it is meant that the active ingredient is present in minimum amounts effective to clean or remove deposits from the surface of substrates to which the thickened aqueous compositions have been applied. For example, where the composition is applied to toilet bowls, an acid will be present in minimum amounts effective to remove salts and stains caused by continuous and/or repeated exposure to water, for example iron salts such as rust and the like. In this case, the thickened composition may comprise from about 0.1 to about 50 wt-% of the acid, more preferably from about 2 to about 50 wt-% of acid, based on total weight of the thickened composition. Where the compositions are applied in the form of a liquid hand dishwashing detergent to, for instance, dishes and plates, the surfactant will be present in minimum amounts effective to remove deposits such as oils and fatty substances emanating from food products, dried food products themselves, dirt, and so forth. Preferably, such cleaning composition will comprise from about 2 to about 95 wt-% of the surfactant, more preferably from about 5 to about 95 wt-% of the surfactant, based on total weight of the thickened aqueous composition.

Exemplary acids used in compositions of the present invention include, without limitation, citric, sulfuric, hydrochloric, phosphoric, acetic, hydroxyacetic, and sulfamic acids.

The cationic polymer is obtainable by conventional polymerization processes. Suitable methods of production are disclosed in U.S. Pat. Nos. 2,982,749, 3,284,393, EP-A-150933, EP-A-102760 and EP-A-126528.

Further embodiments of the present invention are new cationic polymers formed from
a) a water-soluble ethylenically unsaturated monomer or blend of monomers comprising at least one cationic monomer
b) at least one cross-linking agent in an amount of more than 600 ppm by the weight of component a).
c) and optionally at least one chain transfer agent.

Preferably, the component a) comprises 30 to 100 wt-%, based on the total weight of component a), of at least one cationic monomer and 0-80 wt-% of at least one monomer, which is non-ionic or anionic.

More preferably, the component a) comprises 50 to 100 wt-% of at least one cationic monomer and 0-50 wt-% of at least one monomer, which is non-ionic or anionic.

Preferred cationic monomers are compounds according to formula (I)

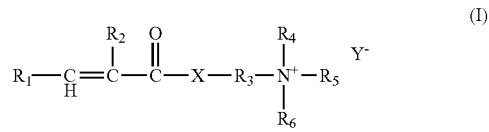

wherein
$R_1$ is hydrogen or methyl,
$R_2$ is hydrogen or $C_1$-$C_4$alkyl,
$R_3$ is $C_1$-$C_4$alkylene,
$R_4$, $R_5$ and $R_6$ are independently from each other hydrogen or $C_1$-$C_4$alkyl,
X is —O— or —NH— and
Y is Cl; Br; I; hydrogensulphate or methosulfate.
The alkyl groups may be linear or branched.

Preferred non-ionic monomers are N-vinyl pyrrolidone or compounds of formula (II)

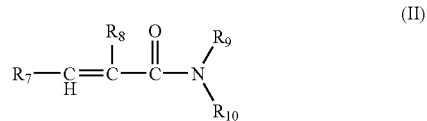

wherein
$R_7$ signifies hydrogen or methyl,
$R_8$ signifies hydrogen or $C_1$-$C_4$alkyl, and
$R_9$ and $R_{10}$ signify independently from each other hydrogen or $C_1$-$C_4$alkyl.

Preferably, the component b) contains at least two ethylenically unsaturated moieties. Suitable preferred cross-linking agents are divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers; such as polyallylsaccharose and pentaerythritol triallylether.

More preferred cross-linking agents are tetra allyl ammonium chloride; allyl-acrylamides and allyl-methacrylamides; bisacrylamidoacetic acid and N,N'-methylene-bisacrylamide.

The most preferred cross-linking agent are tetra allyl ammonium chloride and N,N'-methylene-bisacrylamide.

It is also suitable to use a mixture of cross-linking agents.

In a preferred embodiment of the present invention at least one cross-linking agent b) is included in the range of 650-1200 ppm (based on the component a), more preferred in the range of 700-1000 ppm (based on the component a), most preferred in the range of 700-900 ppm (based on the component a).

Preferably, the chain transfer agent c) is selected from mercaptanes; malic acid; lactic acid; formic acid; isopropanol and hypophosphites.

In a preferred embodiment of the invention at least one chain transfer agent c) is present in a range of from 0 to 50000 ppm (based on the component a), more preferably in a range of from 100-10000 ppm (based on the component a).

A preferred cationic polymer is formed from a) 30 to 100 wt-% of at least one compound according to formula (I)

$$R_1-\underset{H}{C}=\underset{R_2}{C}-\underset{O}{\overset{O}{\|}}C-X-R_3-\underset{R_6}{\overset{R_4}{\underset{|}{N^+}}}-R_5 \quad Y^- \quad (I)$$

wherein
$R_1$ is hydrogen or methyl,
$R_2$ is hydrogen or $C_1$-$C_4$alkyl,
$R_3$ is $C_1$-$C_4$alkylene,
$R_4$, $R_5$ and $R_6$ are independently from each other hydrogen or $C_1$-$C_4$alkyl,
X is —O— or —NH— and
Y is Cl; Br; I; hydrogensulphate or methosulfate, and
0-80 wt-% of N-vinyl pyrrolidone and/or
at least one compound of formula (II)

$$R_7-\underset{H}{C}=\underset{R_8}{C}-\underset{}{\overset{O}{\|}}C-N\underset{R_{10}}{\overset{R_9}{\diagup}} \quad (II)$$

wherein
$R_7$ signifies hydrogen or methyl,
$R_8$ signifies hydrogen or $C_1$-$C_4$alkyl, and
$R_9$ and $R_{10}$ signify independently from each other hydrogen or $C_1$-$C_4$alkyl,
b) at least one cross-linking agent in an amount of 700-900 ppm (based on the component a) selected from the group consisting of divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers, such as polyallylsaccharose and pentaerythritol triallylether, and
c) and from 0 to 50000 ppm (based on the component a), more preferably 100-10000 ppm (based on the component a) of at least one chain transfer agent selected from the group consisting of mercaptanes; malic acid; lactic acid; formic acid; isopropanol and hypophosphites.

A more preferred cationic polymer is formed from
a) 30 to 100 wt-% of at least one compound according to formula (Ia)

$$R_1-\underset{H}{C}=\underset{R_2}{C}-\underset{}{\overset{O}{\|}}C-O-R_3-\underset{CH_3}{\overset{CH_3}{\underset{|}{N^+}}}-CH_3 \quad Y^- \quad (Ia)$$

wherein
$R_1$ is hydrogen or methyl,
$R_2$ is hydrogen or methyl,
$R_3$ is $C_1$-$C_2$alkylene and
Y is Cl; Br or I, and
0-80 wt-% of at least one compound of formula (IIa)

$$R_7-\underset{H}{C}=\underset{R_8}{C}-\underset{}{\overset{O}{\|}}C-N\underset{R_9}{\overset{R_9}{\diagup}} \quad (IIa)$$

wherein
$R_7$ signifies hydrogen or methyl,
$R_8$ signifies hydrogen or methyl, and
$R_9$ signifies hydrogen; methyl; ethyl or propyl,
b) 700-900 ppm (based on the component a) of at least one cross-linking agent selected from the group consisting of divinyl benzene; tetra allyl ammonium chloride; allyl acrylates and methacrylates; diacrylates and dimethacrylates of glycols and polyglycols; butadiene; 1,7-octadiene; allylacrylamides and allyl-methacrylamides; bisacrylamidoacetic acid; N,N'-methylene-bisacrylamide and polyol polyallylethers; such as polyallylsaccharose and pentaerythritol triallylether, and
c) and from 0 to 50000 ppm (based on the component a), more preferably 100-10000 ppm (based on the component a) of at least one chain transfer agent selected from the group consisting of mercaptanes; malic acid; lactic acid, formic acid; isopropanol and hypophosphites.

The new cationic polymers are obtainable by conventional polymerization processes.

The following examples are set forth merely to exemplify the invention and are not intended to limit the metes and bounds of the invention, which is set forth by the claims appended hereto.

Parts and percentages are by weight. The percentages regarding additions to the individual treatment baths or dyebaths relate to the substrate, unless noted otherwise. The temperatures are stated in degrees Celsius.

A) Synthesis of the Cationic Polymer

This example illustrates the preparation of a suitable cationic polymer.

An 'aqueous phase' of water soluble components is prepared by admixing together the following components:
0.3 parts of citric acid-1-hydrate,
0.2 parts of a 40% solution of penta sodium diethylene triamine penta acetic acid (Tetralon® B),
17.0 parts of water,
0.2 parts of methylene-bis-acrylamide,
0.63 parts of sodium hypophosphite, and 81.61 parts of methyl chloride quaternised dimethylaminoethylmethacrylate.

An 'oil phase' is prepared by admixing together the following components:
2.8 parts of sorbitan mono-oleate,
21.4 parts of a polymeric stabiliser (20% in solvent),
51.1 parts of 2-ethyl hexyl cocoate, and
24.7 parts of Exxsol® D40 (dearomatised hydrocarbon solvent).

The two phases are mixed together in a ratio of 1 part oil phase to 1.4 parts aqueous phase under high shear to form a water-in-oil emulsion The resulting water-in-oil emulsion is transferred to a reactor equipped with nitrogen sparge tube, stirrer and thermometer. The emulsion is purged with nitrogen to remove oxygen. Polymerisation is effected by addition of a redox couple of sodium metabisulphite and tertiary butyl hydroperoxide.

After the isotherm is completed addition is made of a free radical initiator (Vazo® 67) and the emulsion held at 85° C. for 75 minutes.

Vacuum distillation is carried out to remove water and volatile solvent to give a final product of 50% polymer solids.

To this product addition is made of 6 parts (by weight of final product) of a fatty alcohol alkoxylate (PPG1-trideceth 6).

B) Preparation of a di(hydrogenated tallow)dimethyl Ammonium Methylchloride (DHTDMAC) Fabric Rinse Conditioner (4% Active Content)

To 1890 g deionised preheated water 111 g melted 50° C. DHTDMAC (Arquad® 2HT-75) are slowly added under stirring. The dispersion is stirred and heated to 50° C. for 15 min under continuous stirring. The mixture is cooled down to 30° C. under stirring. The pH-value is adjusted to 4.0 by addition of citric acid solution.

The rinse conditioner is homogenized by stirring.
LV Brookfield Viscosity (22° C./30 rpm)=90 mPa·s.

C) Preparation of an Esterguat Fabric Rinse Conditioner (5% Active Content)

To 1890 g deionised preheated water 111 g melted 50° C. Esterquat (Rewoquat® WE18) are slowly added under stirring. The dispersion is stirred for 10 min and then heated to 50° C. for 15 min under continuous stirring. The mixture is cooled down to 30° C. under stirring.

The pH-value is adjusted to 3.5 by addition of sodium hydroxide solution.

The rinse conditioner is homogenized by stirring.
LV Brookfield Viscosity (220C/30 rpm)=8 mPa·s.

D) Preparation of an Esterquat Fabric Rinse Conditioner (5% Active Content)

To 1890 g deionised preheated water 111 g of melted Esterquat (Stepantex® VK90) is slowly added at 40° C. under stirring. The dispersion is stirred for 15 min.

Let cooling down the formulation to about 30° C. under agitation and adjust the pH to pH=3.5 by addition of sodium hydroxide solution.

The rinse conditioner is homogenized by stirring.
LV Brookfield Viscosity (22° C./30 rpm)=12 mPa·s.

Addition of the Thickener

The cationic polymer (of A) is slowly added to each softener formulation at room temperature and under stirring until the formulation is homogenized.

The Brookfield viscosity is measured one day after the preparation. The results are summarized in Table 1.

Brookfield Viscosity of Various Fabric Rinse Conditioners Thickened with a LDP Polymer:

TABLE 1

| Softener Formulation | Polymer concentration (wt-%) | LV Brookfield Viscosity (22° C./30 rpm/mPa · s) |
|---|---|---|
| Arquad ® 2HT 75 (B) | — | 90 |
| Arquad ® 2HT 75 (B) | 0.5 | 2000 |
| Rewoquat ® WE18 (C) | — | 8 |
| Rewoquat ® WE18 (C) | 0.5 | 475 |
| Stepantex ® VK90 (D) | — | 12 |
| Stepantex ® VK90 (D) | 0.2 | 170 |
| Stepantex ® VK90 (D) | 0.5 | 700 |

E) Formulation of a Toilet Cleaner Agent
A composition containing
80 wt-% deion. water,
2.5 wt-% Dobanol©25-7 (alcohol ethoxylate),
2.5 wt-% Dobanol©23-6.5 (alcohol ethoxylate), and
15 wt-% citric acid
is prepared by adding successively both alcohol ethoxylate and the citric acid to water under stirring.

The clear and colorless liquid has pH value of 1.7.

F) Formulation of a Bathroom Cleaner Agent
A composition containing
80 wt-% deion. water,
2 wt-% Dehydrol©04 (octyl alcohol ethoxylate 4EO),
8 wt-% Glucopon© 215SCUP (fatty alcohol $C_{8-10}$ polyglycoside),
5 wt-% citric acid, and
5 wt-% acetic acid
is prepared by mixing all components together under stirring.

The clear and colorless liquid has pH value of 2.5.

Addition of the Thickener

The cationic polymer (of A) is slowly added to the both formulation at room temperature and under stirring under stirring until the formulation is homogenized.

The Brookfield viscosity is measured one day after the preparation.

| Acidic Formulation | Polymer concentration (wt-%) | LV Brookfield Viscosity (22° C./30 rpm/mPa · s) |
|---|---|---|
| Toilet Cleaner (E) | — | 5 |
| Toilet Cleaner (E) | 1.0 | 156 |
| Toilet Cleaner (E) | 3.0 | 723 |
| Bathroom Cleaner (F) | — | 5 |
| Bathroom Cleaner (F) | 1.0 | 90 |
| Bathroom Cleaner (F) | 3.0 | 560 |

The invention claimed is:

1. An aqueous household cleaning or laundry care formulation comprising a cationic homopolymer and wherein the cationic homopolymer is formed from
    a) a water soluble ethylenically unsaturated cationic monomer
    b) at least one cross-linking agent in an amount of more than 500 ppm by the weight of component a)
    c) and at least one chain transfer agent.

2. An aqueous formulation according to claim 1 wherein the cationic homopolymer is added to the formulation while in the form of particles, which have a volume average size of below 10 microns.

3. An aqueous formulation according to claim 1, wherein the cationic monomer is a compound according to formula (I)

$$R_1-\underset{H}{\overset{R_2}{C}}=C-\overset{O}{\overset{\|}{C}}-X-R_3-\overset{R_4}{\underset{R_6}{\overset{|}{N^+}}}-R_5 \quad Y^-$$ (I)

wherein
- $R_1$ is hydrogen or methyl,
- $R_2$ is hydrogen or $C_1$-$C_4$alkyl,
- $R_3$ is $C_1$-$C_4$alkylene,
- $R_4$, $R_5$ and $R_6$ are independently from each other hydrogen or $C_1$-$C_4$alkyl,
- X is —O— or —NH— and
- Y is Cl; Br; I; hydrogensulphate or methosulfate.

4. An aqueous formulation according to claim 1 wherein the cross-linking agent of component b) is selected from divinyl benzene; tetra allyl ammonium chloride; allyl acrylates and methacrylates; diacrylates and dimethacrylates of glycols and polyglycols; butadiene; 1,7-octadiene; allyl-acrylamides, allyl-methacrylamides; bisacrylamidoacetic acid; N,N'-methylene-bisacrylamide and polyol polyallylethers.

5. An aqueous formulation according to claim 4, wherein the cross-linking agent of component b) is selected from tetra allyl ammonium chloride; allyl-acrylamides and allyl-methacrylamides; bisacrylamidoacetic acid and N,N'-methylene-bisacrylamide.

6. An aqueous formulation according to clam 1, wherein the chain transfer agent c) is selected from mercaptanes; malic acid, lactic acid; formic acid; isopropanol and hypophosphites.

7. An aqueous formulation according to claim 1, wherein the chain transfer agent c) is present in a range of from 10 to 50,000 ppm based on the component a).

8. An aqueous formulation according to claim 7, wherein the chain transfer agent(s) c) is (are) present in a range of from 100-10,000 ppm based on the component a).

9. An aqueous formulation according to claim 1, wherein the formulation comprises 0.005 to 15 wt-% of the cationic homopolymer.

10. An aqueous formulation according to claim 1, wherein the formulation contains
- a) 0.01-5 wt-% of a cationic homopolymer and wherein the cationic homopolymer is formed from
  a compound of formula (Ia)

$$R_1-\underset{H}{\overset{R_2}{C}}=C-\overset{O}{\overset{\|}{C}}-O-R_3-\overset{CH_3}{\underset{CH_3}{\overset{|}{N^+}}}-CH_3 \quad Y^-$$ (Ia)

wherein
  - $R_1$ is hydrogen or methyl,
  - $R_2$ is hydrogen or methyl,
  - $R_3$ is $C_1$-$C_2$alkylene and
  - Y is Cl; Br or I, and
- b) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 50-1200 ppm (based on the component a), and
- c) at least one chain transfer agent selected from mercaptanes; malic acid; lactic acid; formic acid; isopropanol and hypophosphites in an amount of 1000-9000 ppm based on the component a).

11. An aqueous formulation according to claim 10, wherein at least one cross-linking agent is included in an amount of 700-900 ppm (based on the component a).

12. An aqueous formulation according to claim 10, wherein at least one chain transfer agent is present in an amount of 2000-5000 ppm (based on the component a).

13. A fabric softener composition comprising
- A) 0.5 to 50 wt-%, based on the total weight of the composition, of cationic quaternary ammonium salts; tertiary fatty amines having at least one $C_8$-$C_{30}$ alkyl chains, carboxylic acids having 8 to 30 carbons atoms and one carboxylic group per molecule; esters of polyhydric alcohols; fatty alcohols; ethoxylated fatty alcohols; alkyphenols; ethoxylated alkyphenols; ethoxylated fatty amines; ethoxylated monoglycerides; ethoxylated diglycerides; mineral oils and/or polyols;
- B) 0.005 to 15 wt-%, based on the total weight of the composition, of the cationic homopolymer according to claim 1;
- C) 0 to 20 wt-%, based on the total weight of the composition, of customary additives; and
- D) water to 100%.

14. A fabric softener composition according to claim 13 comprising
- A) 0.5 to 50 wt-%, based on the total weight of the composition, of the fabric softener;
- B) 0.005 to 15 wt-%, based on the total weight of the composition, of the cationic homopolymer;
- C) 0 to 20 wt-%, based on the total weight of the composition, of customary additives;
- D) 0 to 5 wt-%, based in the total weight of the composition, of a perfume;
- E) 0 to 0.5 wt-%, based in the total weight of the composition, a component capable of sequestering metal ions and selected from the group consisting of:
  - i) chelating components selected from the group consisting of amino carboxylic acid, organo aminophosphonic acid components, and mixtures thereof,
  - ii) polycarboxylic building components, other than those defined under i) as chelating components, comprising at least two carboxylic radicals separated from each other by not more than two carbon atoms, and,
  - iii) mixtures thereof, and
- F) water to 100%.

15. A fabric softener composition according to claim 13, wherein the customary additives are alcohols; polyhydric alcohols; amphoteric and nonionic surfactants; oxyethylated fatty alcohols; hydrogenated and ethoxylated castor oil; alkyl polyglycosides; fatty alcohols; fatty acid esters; fatty acids; ethoxylated fatty acid glycerides; or fatty acid partial glycerides; inorganic or organic salts; non-aqueous solvents; pH buffers; perfumes; dyes; hydrotropic agents; antifoams; anti redeposition agents; enzymes; optical brighteners; antishrink agents; stain removers; germicides; fungicides; antioxidants; corrosion inhibitors; dye fixing agents; dye transfer inhibitors; wrinkle recovery agents and/or wet soiling reduction agent.

* * * * *